F. O. WOODLAND.
CIGAR BANDING MACHINE.
APPLICATION FILED APR. 18, 1908.
1,018,091.
Patented Feb. 20, 1912.
6 SHEETS—SHEET 5.
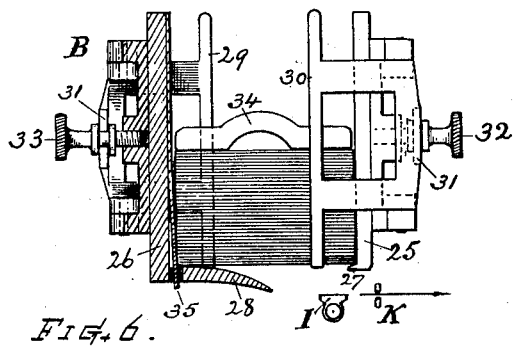
Fig. 6.
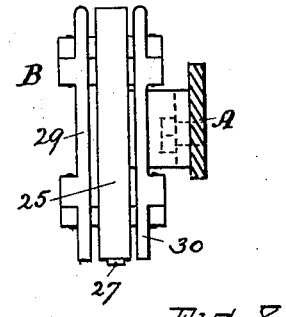
Fig. 8.
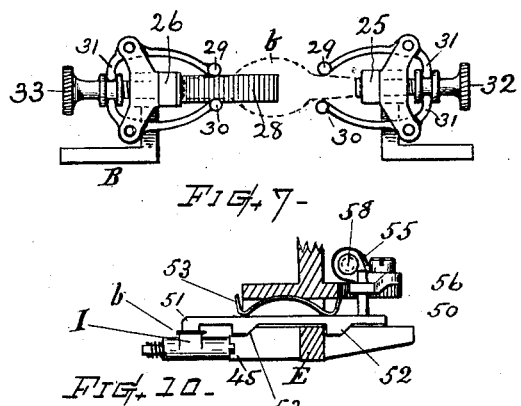
Fig. 7.
Fig. 10.
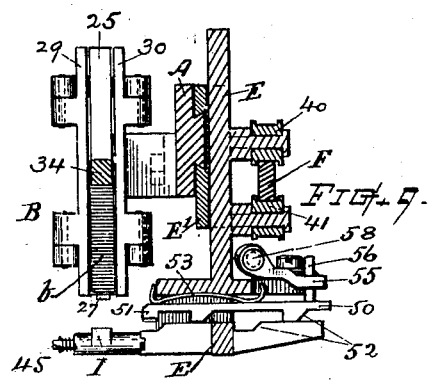
Fig. 9.
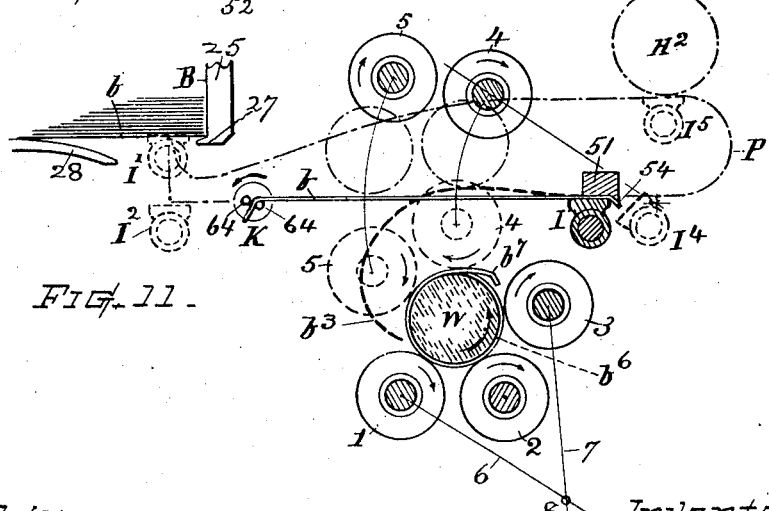
Fig. 11.
Witnesses—
Ellis P. Blinus
Geo. M. Rice
Inventor—
Frank O. Woodland
By Chas. H. Burleigh
Attorney

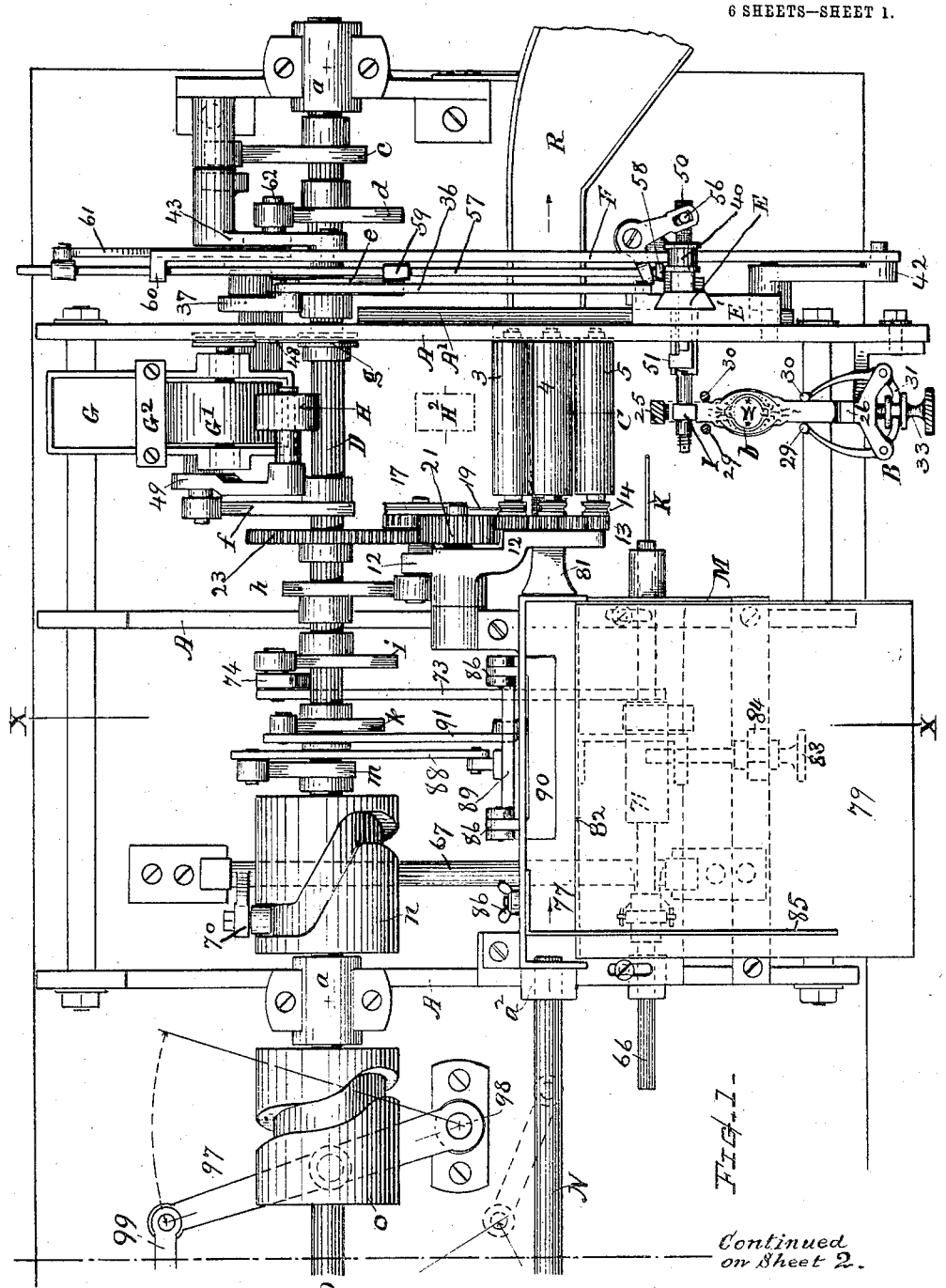

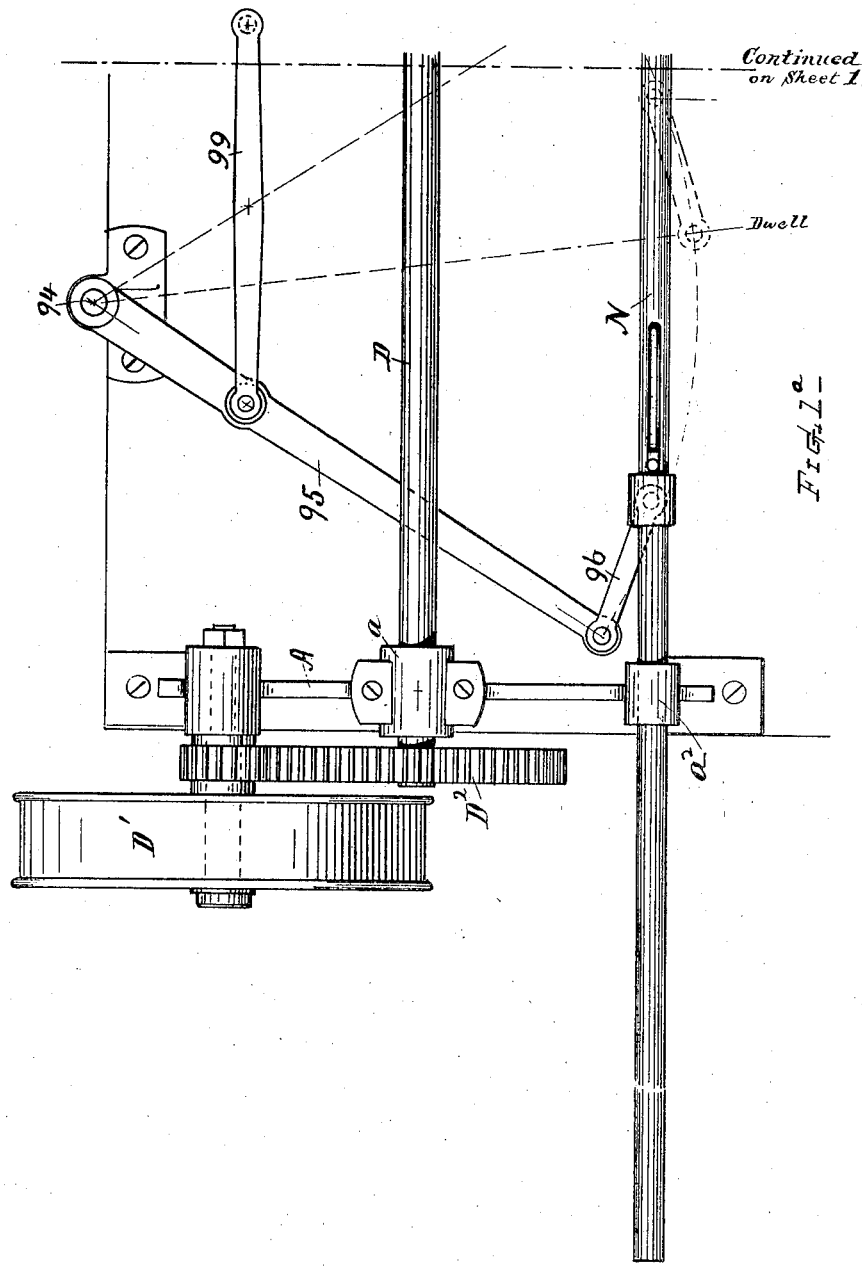

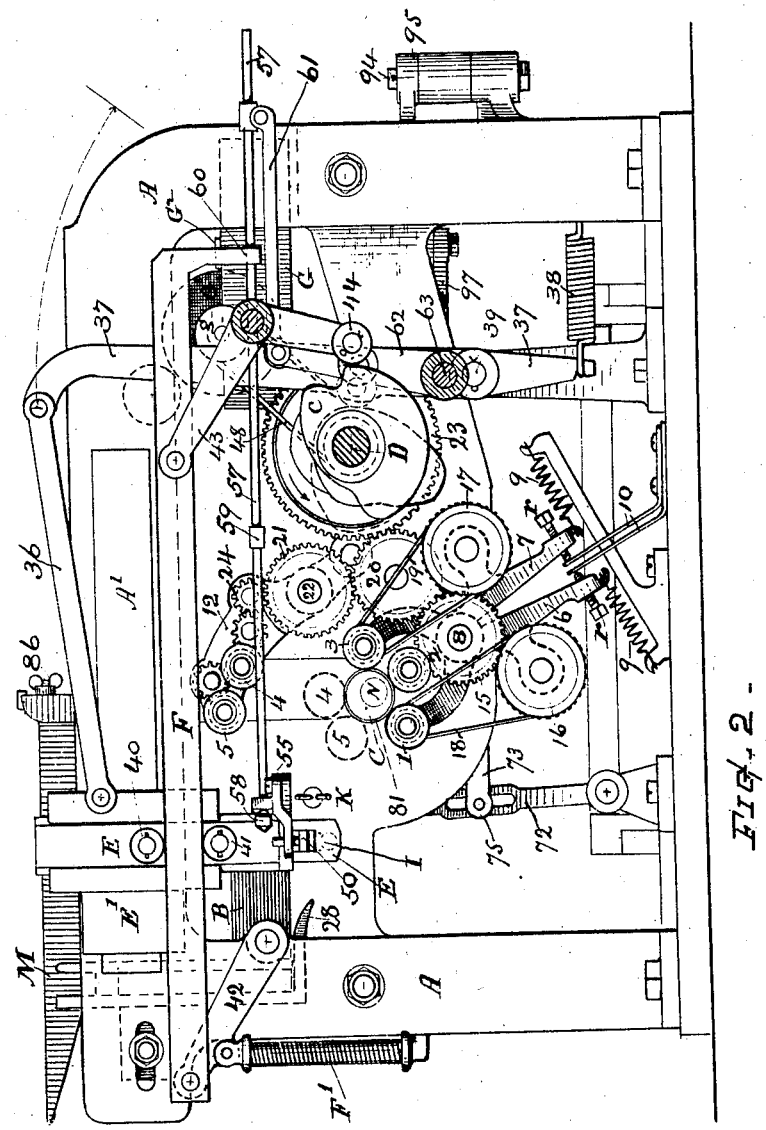

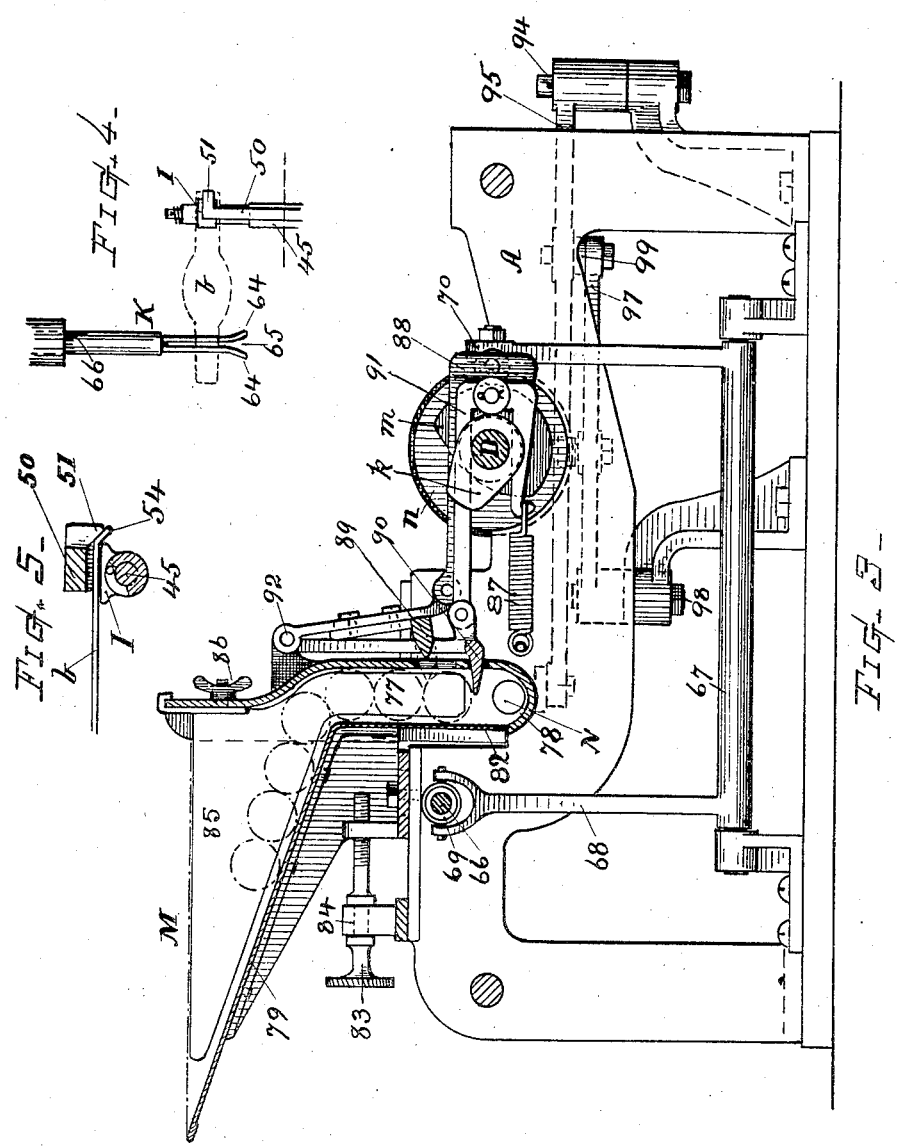

F. O. WOODLAND.
CIGAR BANDING MACHINE.
APPLICATION FILED APR. 18, 1908.

1,018,091.

Patented Feb. 20, 1912.
6 SHEETS—SHEET 6.

Witnesses.
Ella P. Blenus
Geo. M. Rice

Inventor.
Frank O. Woodland,
By Chas. H. Burleigh
Attorney

UNITED STATES PATENT OFFICE.

FRANK O. WOODLAND, OF WORCESTER, MASSACHUSETTS.

CIGAR-BANDING MACHINE.

1,018,091.             Specification of Letters Patent.       Patented Feb. 20, 1912.

Application filed April 18, 1908. Serial No. 427,905.

*To all whom it may concern:*

Be it known that I, FRANK O. WOODLAND, a citizen of the United States, residing at Worcester, in the county of Worcester and State of Massachusetts, have invented a new and useful Cigar-Banding Machine, of which the following is a specification, reference being made therein to the accompanying drawings.

The prime object of my present invention is to provide a practicable and efficient machine for automatically applying and affixing paper bands, or band labels, upon individual cigars, or like articles.

A further object of my invention is the curling, crimping or curving of the bands preparatory to their fixation about the cigar; and the providing of mechanism for effecting the curling or curving of a band as it passes from the supply-holder to the devices that wrap it about the cigar or article to which it is to be affixed.

Another object is to provide means for gluing, gripping, and transferring the bands from the supply-holder to the winding-on mechanism, as more fully hereinafter set forth.

Another object is to provide means for supporting and rotating the cigar, and for wrapping the band about its periphery and securing together its ends; while thus supported. Also, to provide means for intermittently introducing cigars, or the like, into said rotating means, and for discharging the same therefrom after the bands are affixed thereto.

Another object is to provide a roller means for supporting and rotating a cigar and winding a band thereon; with means for moving certain of the rollers away from and toward the others, for the access of the band-carrying devices and for closing the roller means upon the band and cigars.

Another object is to provide means for arranging, selecting and successively feeding cigars to the band-applying devices, and having facilities for adjustment for cigars of different sizes, as more fully hereinafter explained.

Minor objects and features of my invention will be specifically set forth in the following detailed description, and defined in the claims.

Figure 12:
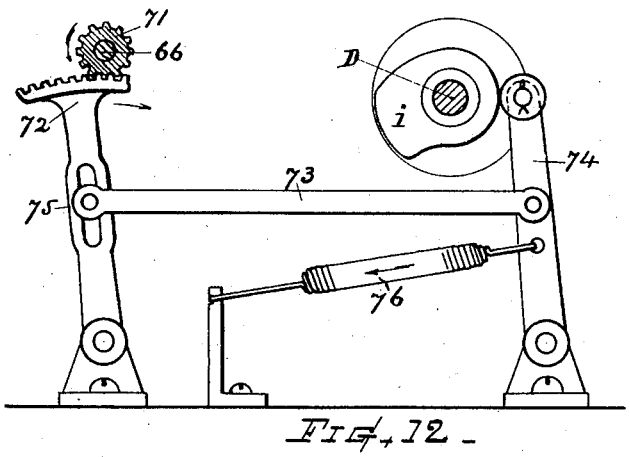
Figure 13:
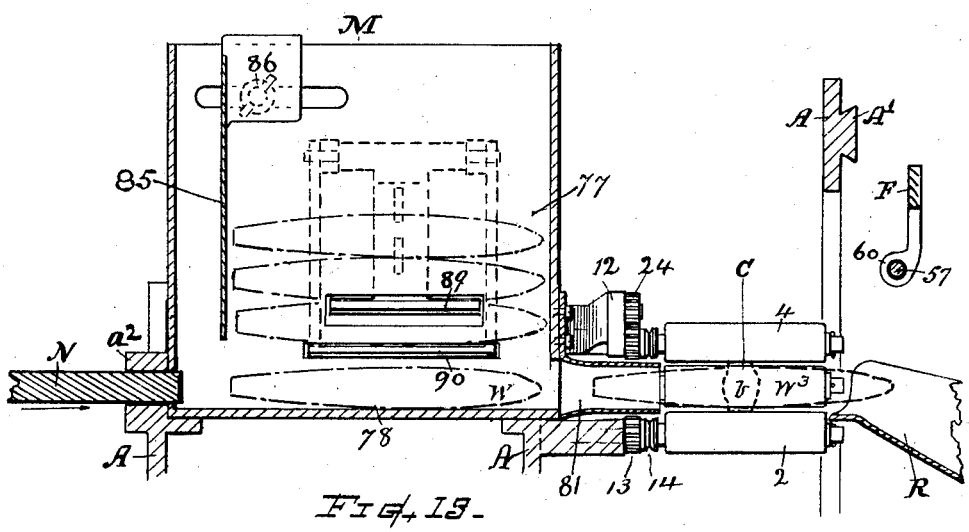
Figure 14:
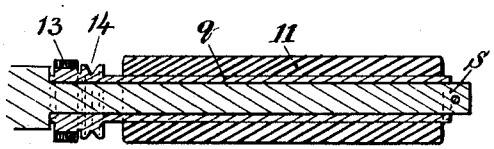
Figure 15:
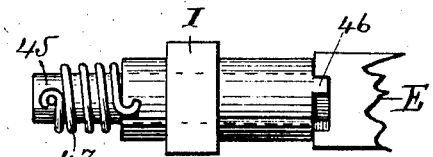

In the accompanying drawings, Figure 1 (Sheet 1) represents a plan view of the main portion of a band-affixing machine embodying my invention. Fig. 1ᵃ (Sheet 2) represents a plan view of that portion of the machine omitted from Sheet 1, but being a continuation of the same view. Fig. 2 represents an end elevation of the same; the end of the shaft and some of the parts being shown in section. Fig. 3 represents a vertical section through the feed-hopper or chute at the position of line X X on Fig. 1. Fig. 4 is a fragmentary plan view showing the detail of a picker and band-curling means. Fig. 5 shows a sectional detail of a picker and grip-device. Fig. 6 represents a separate elevation of the band-supply holder, partly in section and partly in side view. Fig. 7 is a plan view of the band-holder. Fig. 8 is an inner face elevation of one end of the holder. Fig. 9 represents a sectional detail view of the picker-carrier, picker-device and grip-mechanism combined therewith, with the grip retracted. Fig. 10 represents the picker and grip-mechanism with the grip closed. Fig. 11 is a diagram illustrating the operation of the band-affixing mechanism. Fig. 12 is a separate detail view of devices for rotating the curler. Fig. 13 is a vertical longitudinal sectional view, showing the chute and rotator. Fig. 14 is a sectional detail view of one of the rotator rolls. Fig. 15 is a separate plan view of the picker on an enlarged scale.

In the practical embodiment of my invention I provide means for supporting a supply or pack of bands, from which single bands are taken as required; a rotator mechanism for supporting the cigar or article to which the band is to be applied, and for rotating the same while the band is being affixed thereto; a picker mechanism for applying glue or adhesive substance to the band, and for taking said band from the supply-holder and presenting it to the rotator for affixment around the cigar; a means for curling or curving the band as it is transferred from the holder to the rotator; a gripping means for securely retaining the end of the band upon the picker while it is passed through the curling devices; means for applying glue or adhesive matter to the face of the picker; a hopper or chute for receiving and arranging the supply of cigars or like articles, and means for selecting and delivering the cigars from the chute to the rotator or banding devices in regular and successive order, and discharging the finished work as completed. Suitable actuating mechanisms are provided for imparting movement to the several operating elements, from a power shaft, whereby the various means perform their functions automatically in due order, and by mode of operation, the nature of which will be more fully disclosed in the following detailed description; the particular subject matter claimed being definitely set forth in the summary.

Referring to the drawings, A denotes the frames, which can be of any suitable construction for supporting the various parts of the machinery.

D denotes the operating shaft journaled to rotate in suitable bearings $a$ upon the machine frame, and carrying a series of cams $c, d, e, f, h, i, k, m, n$ and $o$; which cams are severally shaped and individually disposed in proper manner for imparting the particular quality, time and extent of action required for the various working mechanisms respectively actuated thereby. The shaft may be operated by any suitable driving means; in the present instance a pulley $D^1$ and gears $D^2$ are arranged in connection therewith, as shown in Fig. 1.

B indicates the holder for supporting the supply or pack of bands $b$, and preferably arranged for the bottom delivery thereof as hereinafter explained.

C indicates a centering appliance, winder or rotator, which consists of a series of small rollers, 1, 2, 3, 4 and 5, arranged to turn upon parallel axes or spindles, and disposed in a manner to embrace the cigar between the group of rollers and effect rotation thereof. The several rollers are driven in a common direction of rotation and with approximately uniform speed; and serve for supporting and rotating the cigar, and winding the band about its periphery and closing on the adhesive end of the band by the rotative action. In the present instance roller 2 is mounted on an axle fixed on the frame. The axis shafts of rollers 1 and 3 are respectively supported on levers 6 and 7 which are pivoted upon a fulcrum or stud 8 so as to swing the rollers slightly outward and inward. A suitable spring 9 is connected with each lever to afford a yielding pressure of the rollers toward the intermediate space. A spring, or springs, 10, are preferably arranged between the ends of the arms 6 and 7 for maintaining the two arms with the rolls 1 and 3 in an approximately uniform relation to the roll 2. Said springs may be fixed to a stationary part of the frame with their yieldable ends projecting upward at a slight distance apart between the levers. (See Fig. 2.) Each lever is best provided with a regulating screw $r$ whereby proper adjustment can be effected for centralizing the parts. The axis shafts of the rotator rolls 4 and 5 are supported upon a movable carrier, or swinging arm 12, whereby said rollers can be raised for opening the rotator to permit passage of the picker or band-feeding devices, and depressed or closed down for embracing and winding on the bands. In Fig. 2 these rolls are shown at raised position by full line, and at normally closed position by dotted lines. The rotator rolls are each preferably constructed with an exterior facing 11, see Fig. 14, of soft vulcanized rubber, or similar semi-elastic substance, surrounding a tubular metallic bushing $q$ that can be slipped on and off the axis spindle S; the end of said bushing projecting from the body of the roll and having fixed thereon a pulley 14 and gear 13, as illustrated. These rolls are suitably geared to rotate in the same general direction, as indicated by arrows on Fig. 11. The means for operating the rotator rolls may be of any efficient construction; a preferred arrangement of gearing therefor is shown in Fig. 2. A gear 15 is mounted on the stud 8, meshing with the gear on roll 2 direct, while 16 and 17 indicate combined gear-and-pulley disks, mounted on axis studs fixed to the respective arms 6 and 7, with their teeth meshing with gear 15, and their pulley rims connected by belts 18 and 19 with the pulleys 14 of rolls 1 and 3 respectively. An intermediate gear 20 is mounted on a stationary axis and meshes respectively with the gear 15 and the gear 21 mounted upon the fulcrum 22 of the arm 12, and with the gear 23 fixed on the operating shaft D, whereby the train of gears and rolls are actuated. The rollers 4 and 5 are connected with the gear 21 by a suitable train of small gears mounted on axis studs fixed on the arm 12, as indicated at 24 on Fig. 2; or in a manner that will effect rotation of the rolls while permitting the upward and downward movement of said rolls for opening and closing the rotator space.

The band-holder B comprises two end-guiding uprights 25 and 26, having means for attachment to a supporting frame; one 26 being preferably adjustable thereon to regulate the holder for bands of different length. The leading end guide 25 is provided with an inward lug or point 27 at its lower end, and the opposite end guide is best formed with a long under projecting tongue 28 having a downwardly curved surface upon which the bands are supported, in a manner for bottom delivery, or to be drawn out from the under face of the pack. Upon each of the end-guiding uprights there is hinged a pair of oppositely swinging wing members respectively carrying the side guide-posts 29 and 30; said members having inwardly curved ends 31 that engage with a flanged adjusting screw, 32 and 33, threaded into and projecting from the outer side of the upright, substantially as shown in Figs. 6, 7 and 8. By turning the screw 32, or 33, the opposite side guide-posts can be simultaneously accurately adjusted out or in laterally, for centering and guiding the edges of the pack of bands, and for accommodating bands of different form or dimension.

The pack of labels or bands $b$ is supported upon the holder between the guide-posts, and a weight 34 is placed upon the top of the pack as a follower for keeping them compact. If desired a spring 35 may be arranged on the upright 26 to press the pack toward the face of the guide-post 25. The holder is positioned so that the glue-coated face of the picker, when elevated, contacts with the bottom band of the pack near the end thereof, and as it descends draws the end of the band from the point 27.

E indicates a picker-carrier arranged to move up and down upon a slide-piece $E^1$ that has horizontal movement along a suitable guideway $A^1$ upon the frame A. Said slide is connected, by a link 36, with a lever 37 that is fulcrumed at 39 and actuated by the cam $e$ upon the shaft D for imparting reciprocating movement to the slide-piece and picker-carrier. A suitable spring 38 is connected with the lever for keeping its roller against the face of the cam.

F indicates a lifting-bar extending along the line of movement of the slide $E^1$, and having the picker-carrier connected therewith by lugs or rollers 40 and 41, whereby it can travel along the bar while the latter is raised and depressed. The lifting bar is provided with means for supporting it and effecting elevation and depression thereof. In the present instance it is supported by two swinging arms 42 and 43 pivotally connected therewith, and fulcrumed on suitable axis studs fixed to the frame, (see Fig. 2) one of said arms having an extension and contact-roller 44 for actuation by the cam $c$ upon the shaft D. Movement of the lifting-bar controls the upward and downward movements of the picker-carrier E and picker devices. A suitable reaction spring $F^1$ may be employed for moving the bar in opposition to the action of the cam.

I indicates the picker for applying glue or adhesive substance to the band; taking the band from the pack and transferring it to the winding-on rotator. Said picker consists of a tubular hub having a glue-applying face of suitable form thereon for contact with the band. It is mounted upon an arm 45 projecting from the lower part of the picker-carrier and extending to a position in alinement with the supply-holder and rotator. The picker (see Fig. 15) is preferably arranged in a manner to permit partial rotation thereof upon its support, the end of which is formed cylindrical. A stop-lug 46 is provided for limiting the rotative movement of the picker, and a suitable spring 47 for returning it to normal position.

G indicates the glue-box, or reservoir, for containing the supply of adhesive material; $G^1$ a delivering roller running therein, and $G^2$ a scraper for gaging the amount of glue on the face of the roll. Suitable pulleys or sprocket wheels $g$ are provided upon the roller axle and cam shaft and connected by a belt or chain 48 for revolving the glue-delivering roll.

H indicates a glue-transferring roller having its journal supported upon a lever 49 to swing from a position in contact with the face of the delivering-roll to a position $H^2$, where it contacts with the face of the picker for coating said face with glue as the picker returns toward the band-holder. The lever 49 is actuated by the cam $f$ carried by the shaft D.

Combined with the picker-face I provide a gripping means for securely retaining the band or label upon the picker while transferring it from the supply-holder to the rotator or affixing devices. Said gripping means is adapted to have a gripping action, and a receding movement for taking it out of the way when the picker approaches the pack. (See Figs. 5, 9 and 10.) It comprises an endwise movable bar 50 having a gripping head 51 and beveled surfaces 52 disposed to effect a closure of the grip as the bar is moved endwise in one direction, and a release of the grip when moved in the other direction; the grip-bar being pressed downward by a spring 53 arranged in suitable connection with the parts. The head of the grip-bar is suitably formed for pressing a portion of the band $b$ against the face of the picker I; and is best provided with a lip that serves to bend downward a small portion at the end of the band, as shown at 54 on Figs. 5 and 11. Means is provided for imparting endwise movement to the grip-bar while moving with the picker-carrier. Said means preferably comprises an angle lever 55 fulcrumed on a bracket that is attached to the picker-carrier. One arm of said lever embraces a pin or lug 56 fixed to the grip-bar, while its other arm has an opening therethrough in which a shifting-rod 57 is arranged to slide; said rod being provided with a head 58 and a collar 59, which cannot pass through the opening in the arm of the angle-lever, or with other equivalent engaging means for actuating the grip-device at predetermined positions of the picker action. The rod 57 is supported, near its rear end, in a loose running eye 60 attached to the lifting-bar F, and it is joined by a suitable connection 61 with a lever or member 62 fulcrumed at 63 and actuated by the cam $d$ of the cam-shaft;

said cam being suitably shaped to impart the required quality and extent of movement, for shifting the grip-bar from the position shown in Fig. 9 to the position shown in Fig. 10, and vice versa. When at the first position the grip-bar is entirely out of the line of the picker I, so that the face of the picker can contact with the glue-roller, or with the pack of bands, without the gripping member interfering therewith. By bending down the end 54 of the band it is caused to lie snug when placed around the circle, and liability of the glue or adhesive spreading out upon the face of the band is obviated.

A feature of my invention is the crimping or curling of the band to give it an inherent curved set, preparatory to its application to the cigar, thereby facilitating its introduction to the rotator and the ready winding on and affixment of the band in proper manner. Means for effecting the curling operation is illustrated at K. In the present instance it consists of a fork or member comprising two prongs 64 (see Fig. 4) with a narrow jaw space 65 through which the band $b$ can pass between them. The fork is carried by a shaft or rotatable member 66 capable of partial revolution, and movable endwise for projecting the fork across the path of the picker and band as the latter is withdrawn from the supply-holder, thereby engaging the band within the jaw space 65 between the prongs; then by a partial rotation of the fork causing a crimp and friction on the band as it is drawn forward, so that when the extremity of the band escapes from the fork its latter end will curl downward, as indicated by dotted lines $b^3$ on Fig. 11. The fork is preferably formed of two parallel prongs of stiff wire or metal rigidly fixed to and projecting from the end of the shaft 66, and having their outer extremities slightly bent outward; the jaw-space 65 being approximately coincident with the axis of the shaft. As a means for shifting the shaft endwise there is provided a rocker 67 having a furcated arm 68 engaging with a ring-collar 69 on the shaft, and an arm 70 having a roll or stud that engages with the groove of the barrel cam $n$ of the cam shaft D.

For effecting rotative movement of the fork any suitable devices may be employed. In the present instance the shaft is provided with a gear 71 that is actuated by a segment carried upon a lever 72 which in turn is connected by a link 73 with a lever 74 having a roll or lug that works in contact with the cam $i$, which is of suitable form for giving the desired action. The link is best made adjustable at its pivoting 75 to one of the levers as a means for regulating the extent of the rotative action of the curler fork. 76 is a retracting spring.

M indicates a feed-hopper comprising a chute 77 in which the cigars or like articles can arrange themselves in single order, and an inclined table or plate portion 79 to facilitate the charging of cigars into the machine. The bottom of the chute is formed as a cradle or feed-way 78 for longitudinally supporting a cigar, or the like, approximately in alinement with the receiving space of the rotator C; and an opening is formed at the end of the cradle for the ejectment of the cigar endwise from the chute into the rotator. A guide funnel 81 is best provided at the exit of the chute for conducting the cigar past the gearing and directly into proper position within the rotator. Guide funnels of various sizes may be interchangeably used, to accord with the diameter of the particular style of articles or cigars to be banded. The width at the interior of the chute is made to suitably accommodate the diameter of the cigars, so that the same can move readily therein and without clogging. In some cases the chute may be made of a fixed size if desired; but in the present instance, and preferably, the back wall of the chute is arranged stationary upon the frame and the front wall 82, with the inclined table portion 79, is arranged adjustable toward and from the back wall, as best shown in Fig. 3. An adjusting screw 83, collared to a stationary lug 84 and threaded into a portion of the plate-supporting bracket, serves for conveniently effecting the desired adjustment for fitting the space within the chute to any desired size of cigar. One end of the hopper is provided with a longitudinally sliding upright plate 85, retained by a thumb-screw device 86, which plate can be placed at any desired position for accommodating the interior of the hopper and chute to the length of cigars of different styles, as required.

The chute is provided with an automatic check-device 89, and a separator-device 90 for effecting delivery, at the bottom of the chute, of one cigar at a time. Said devices are in the present instance operated by connections 88 and 91, and the cams $k$ and $m$ on the operating shaft. The check device 89 and separator 90 herein shown (see Figs. 3 and 13) are hinged at 92 to swing in and out through openings in the back of the chute. When the check member is moved inward it prevents all the overlying cigars from descending; then if the separator is drawn back it allows the single cigars W, lying between the check and separator, to fall to the feed-way cradle or the bottom of the chute. When the separator is again moved into normal position it stops the descent of the cigars from above while the check-device is retracted; thus allowing the selected cigar W at the bottom to be moved endwise out of the chute without liability of damaging its wrapper leaf. The check-device connection 88 and separator connection 91 are moved rearward by the cams and are drawn forward by suitably arranged springs, as spring 87, that afford a yielding action so that said parts are not liable to crush cigars in the chute.

Combined with the hopper-chute I provide means for intermittingly feeding or transferring cigars singly from the chute to the rotator or banding mechanism. For this purpose I employ a pusher or feed-rod N, which may be a solid or tubular rod arranged in suitable bearings $a^2$, to have longitudinal reciprocative movement; its front end passing along the bottom of the chute for ejecting the selected cigar therefrom endwise through the mouth of the chute into the rotator. For operating said pusher-rod there is shown, in Fig. 1, a compound lever connection, comprising a prime lever and second lever, the latter lever 95 being fulcrumed at 94 and connected to the pusher-rod by a pivotally attached link 96, while the primary lever 97 is fulcrumed at 98 to a stationary support and has its arm connected to the lever 95, at an intermediate point thereon, by the pivotally attached link 99. Said primary lever is provided with means for engagement with and actuation by the cam $o$ of the cam shaft.

A single lever might be employed instead of the two levers 95 and 97, but owing to the extent of movement and the required space, the compound levers are deemed preferable. When at its normal non-active position the pusher-rod rests with its front end at or near the outer end of the chute. The cam $o$ is adapted to effect a primal movement of the pusher sufficient to feed the cigar into the rotator, then give a dwell while the band is being affixed; then a further forward movement to push the cigar from the rotator into the discharge trough R, or other suitable receiver, and then a quick complete return of the pusher-rod to its first position.

It will be observed that the rollers forming the cigar-holding rotator, or especially the liftable rollers 4 and 5, are mounted upon projecting spindles that have their support only at one end; said rollers thus outstanding from their support in one direction and overhanging the central plane or path of the bands; while the picker, or picker and grip-device, are carried upon an arm or outstanding member that projects from an opposite direction across the path or central plane; thus the interpassing of the band carrying or picker devices, through or past the cigar-holding rotator or series of winding-on rollers, can be effected without interference of the said devices or their supporting connections.

The operation is as follows: Referring to the diagram Fig. 11, the face of the picker I travels approximately in the path indicated by the dot and dash line P. The rolls 4 and 5 are raised by elevation of arm 12 at about the same time that a cigar is pushed from the chute by the rod N and received upon the rolls 1, 2 and 3. The picker is moved to position $I^1$ in contact with the pack of bands; its glue-coated face adheres to the lower band, near its end, and takes that end of the band from the holder B, and immediately after it is released from the pack by descent of the picker to position $I^2$, the grip device is brought into action by a rearward pull on the rod 57, causing the band to be gripped firmly to the picker face; the extremity of the band being bent downward, as at 54, by the lip of the gripping head. As the picker moves away from the supply-holder, pulling the band from the tongue 28, the curler fork K shoots across the path of the detached band, with one of its prongs above and the other beneath the band; and said fork is then partially rotated in the direction indicated by arrow on Fig. 11; thus producing a crimp in the band while the picker advances, passing beneath the rolls 4 and 5 and dragging the band through the curler so that when its latter end escapes from the fork the band has an inherent curved set and assumes a downwardly curled or curved position, approximately as indicated by the dotted line $b^3$. The rollers 4 and 5 are then brought down upon the top of the band, causing its curled end to be tucked between the roll 1 and surface of the cigar W, which is supported and rotating in conjunction therewith. At about the same time the rollers 4 and 5 are closed down upon the cigar, the rod 57 is actuated in a direction opposite to that of the picker-carrier movement, thereby causing a shift of the angle-lever 55, by contact of the collar 59, and effecting release of the gripping device 51 from its hold upon band $b$, which latter is then, by reverse movement, stripped from the picker-face by the pull of the rollers upon the band, the picker tipping, as at position $I^4$, by reason of the yielding of its spring, in a manner to ease the peeling off of the glued surface, and the band is drawn into the rotator and wound about the rotating cigar, as indicated at $b^6$, and its glued end $b^7$ pressed down and secured to the underlying portion of the band, substantially as illustrated. The group of rotator rollers continue to roll the band and cigar together until the band is securely affixed. When relieved of the band $b$ the picker moves upward and returns to the supply-holder for another band, passing on its return above the rollers 4 and 5, which are then at their depressed position and acting upon the cigar or article within the rotator. During its return movement the picker is met, as at position I⁵, and its face re-coated with glue or adhesive by the glue-transferring roller H, which swings over from the glue-delivering roll G¹ to the position H², and immediately returns to said roll after coating the picker. At the proper time the check-device 89 in the chute 77 is pressed forward, and the separator 90 retracted; thereby permitting a single cigar or article to fall to the bottom of the chute. The pusher or feed-rod N is then moved forward projecting this selected cigar or article into the rotator to the position indicated by dotted lines W³ Fig. 13 where the band is applied thereto; then the pusher rod is further advanced, ejecting the banded cigar or article from the rotator to the discharge trough or receptacle R, the pusher returning to normal position ready to present another cigar into the rotator as the picker again starts forward for repeating the operation.

I am aware that changes may be made in practicing my invention by those skilled in the art, without departing from the nature and scope thereof as expressed in the claims. I do not wish, therefore, to be limited to the special construction in detail herein shown.

What I claim and desire to secure by Letters Patent is—

1. A machine for banding cigars or the like, comprising a cigar-supporting rotator, consisting of a group of rotatively actuated rollers, means for arranging and feeding cigars thereto, means for supporting a supply of bands, a movable picker-carrier, a picker carried thereon adapted for applying glue to one end of a band and transferring said band to the rotator, a gripping means acting against said picker for retaining the band thereon, means for curling the latter end of the band preparatory to its introduction to the rotator, means for releasing the picker grip mechanism for actuating the picker-carrier, and means for applying glue to said pickers.

2. A cigar banding machine, including a band-winding mechanism arranged for holding and rotating the cigar, a cigar-feeding chute adjacent thereto and having a feed-way in approximate axial alinement with said band-winding mechanism, means for passing a cigar from said feed-way to the winding mechanism, a band-supply holder arranged for sustaining a pack of bands, and delivering single bands therefrom, a picker for gluing and taking the bands from said pack, a picker-carrier moving said picker for delivering the bands to the winding mechanism, and suitable means for actuating the several winding, feeding, and picker mechanisms, substantially as set forth.

3. In a cigar-banding machine, a cigar-holding band-winding rotator comprising a series of rollers mounted on approximately parallel axes, and grouped for action in circular order, the axis-supporting means being at one end of the rolls; in combination, with a tubular feed-channel for the cigar through said axis-supporting means in approximate axial alinement with the common center of the group, and a band-delivering element that moves transversely to said axes.

4. In a cigar-banding machine, a cigar-supporting rotator comprising a series of endwise projecting yieldably supported rotatable rollers disposed about a central space into and from which a cigar can be passed endwise in combination with means for automatically injecting a cigar, or the like, into said space.

5. In a cigar-banding machine, a cigar-supporting rotator or matrix comprising a series of endwise-removable tubular rollers mounted upon non-rotatable axles, said axles supported at one end and free at their other end, a movable carrier having a part of the series of roller-axles supported thereon, means for moving said carrier perpendicular to the plane of the axles, a band-carrying glue-applying picker, actuating and guiding means that controls said picker to carry the bands under the elevatable rollers, when moving it in one direction, and to pass over said rollers when moving in the opposite direction.

6. In a cigar-banding machine, means for wrapping a band circumferentially about the cigar, comprising a series of rotating yieldably supported rollers disposed in a circular group, and means for retracting and advancing certain of said rollers for admitting the band, and a band-carrying picker that passes beneath the retracted rollers.

7. In a banding machine, a rotator means for supporting a cigar or the like and winding a band thereon, comprising a system of five rollers, the same including one roller rotating on a stationary axis, the rollers at either side thereof mounted on oppositely yieldable axle-supporting arms, a pair of rollers mounted on axles fixed to a lifting member, said lifting member fulcrumed for swinging action, means for automatically advancing and retracting said lifting member, and a train of gearing for rotating said pair of rollers approximately in unison and in the same direction of rotation.

8. In a machine of the character described, a supporting rotator or matrix comprising a system of rotatable rollers, the axes for the rollers at one side thereof being supported on a movable arm, means for retracting said arm, a train of roll-actuating gears, mounted on said arm, a reciprocating picker-carrier having a laterally projecting arm, a picker mounted on said carrier arm and movable into or through the space left by the retraction of said rollers, and mechanism for operating the picker-carrier.

9. In a machine of the class described, a supporting matrix or rotator comprising a series of five rollers grouped in a circle and mounted on approximately parallel axles, said rollers provided with driving means, an upwardly swinging arm carrying the axles of the upper rolls, a pair of oppositely swinging levers carrying the axles of the alternate lower rollers, a central fulcrum-stud for said levers, springs connected with said levers, a central gear mounted on the fulcrum stud and driving the central roller, gear-and-pulley disks supported on the respective levers and meshing with said central gear, bands from the respective pulley-disks driving the alternate lower rollers, a train of gears carried upon said swinging arm for driving the top-rollers, a gear on the arm-pivoting axis actuating said train, an intermediate gear meshing with said latter gear and with the central gear of the lower set, and means for imparting movement to said intermediate gear for operating the series of rollers.

10. In a machine for banding cigars and the like, a bottom delivering band-supplying holder, comprising upright end-guiding posts having means for sustaining a pack of bands, laterally swinging wing-members hingedly connected with said end-guiding posts and carrying side-guiding devices, said wing-members having inwardly extended arms, and flanged adjusting-screws supported in connection with the end-guiding post and engaging the arms of a pair of said wing-members for simultaneously adjusting the pair of side guiding devices.

11. In a banding machine of the class described, a band-supply holder having guides for supporting the respective ends of a pack of cigar bands or the like, one of said guides being provided with a long extended tongue underlying the pack and having a downwardly curved top surface at its end, for upholding the latter end of the band while it is being withdrawn from the holder.

12. In a cigar banding machine, in combination, means for supporting and rotating a cigar, means for gluing one end of a band and carrying said band to position for affixment, means for curving the other end of said band, and means for automatically advancing said curved end about the cigar and laying its glued end down upon the exterior thereof.

13. In a band-affixing mechanism, in combination, with means for pasting and placing a band; a means for curling the band as it is carried to the place of affixment.

14. In a banding machine, in combination with means for affixing a band, means for imparting an inherent preliminary set or crimp to the band in the direction of its ultimate curvature, previous to its placement upon the article for affixment thereto.

15. In a band-affixing machine, in combination with means for pasting and affixing a band, of a tensional crimping means for curling the band previous to its presentation for affixment.

16. In a cigar-banding machine, the combination, of means for gluing and feeding bands, means for curling the non-glued end of the band, and means for passing the curled end of the band around the cigar.

17. In a band-affixing machine, the combination with band-affixing devices, and transferring devices that carry the band to the affixing device, of means for curling the non-pasted end of the band, means for advancing the curled end about the cigar, and means for closing the ends of the band together thereon.

18. In a cigar-banding machine, in combination with a band-supply holder, means for affixing the band about a cigar, and a glue-applying picker that takes a band from the holder and transfers it to the affixing devices; a grip device on said picker, and a partially rotatable endwise movable curling device having a bifurcated jaw that engages the band in rear of the picker for curling its extremity, for the purpose set forth.

19. In a cigar-banding machine, in combination with a band-supply holder, band-affixing mechanism, and means for delivering the bands thereto; a band-curling device disposed between the supply-holder and the band-affixing mechanism, and consisting of a furcated member having a band-receiving jaw, means for moving said curling device into and from the path of the band, and means for imparting an oscillating or rotal movement to said curling device.

20. In a cigar-banding machine, in combination with the band-supply-holder, means for supporting a cigar or the like and winding a band thereon, and a glue-applying picker that transfers the bands from said holder to the winding-on mechanism: of a band-curling mechanism comprising an endwise movable shaft having a bifurcated pronged end-member, and provided with a gear-pinion, and a ring-collar mounted upon said shaft, a rocker having a cam-engaging arm and an arm engaging with said ring-collar, a lever mechanism carrying a segment that meshes with said gear, and a cam-shaft provided with cams for respectively actuating said rocker and said segment-carrying lever.

21. In a band-affixing machine, the combination, of means for gluing and delivering a band, means for curving the rear end or glued end of said band, and a cigar-holding means comprising a system of rollers that receive the curved end of the band and carry it, in reverse direction, about the cigar bringing its reverse end beneath the glued end.

22. In a machine for affixing bands upon cigars and the like, in combination with means for gluing and presenting the band, a rotator matrix for supporting and wrapping the band about the article, and means for intermittently feeding cigars into said rotator matrix endwise, and discharging the same therefrom.

23. In a machine for affixing bands around cigars or the like, the combination, with means for supporting a pack of bands for bottom delivery of bands therefrom, and a rotator means for laying the band around the article to be banded; of a movable gum-applying picker that acts for gumming one end of the under band in the pack, removing the same singly therefrom and presenting the ungummed end of the band for passage about the article, and means for imparting to the band an inherent inward crimp or curvature after it leaves the pack and preparatory to the entrance of its end into said rotator.

24. In a machine for affixing bands upon cigars, a supply-holder for bands, means for gluing and taking a band therefrom and transferring it to the place of affixing, a curling device acting upon the band between the supply holder and place of delivery, a system of rollers that pass the band about the object, and means for intermittently feeding cigars onto said roller system and discharging them therefrom.

25. In a cigar-banding machine, in combination with means for supplying bands, and means for affixing a band about a cigar; a band-transferring glue-applying picker, a gripping device that acts against the face of said picker for retaining the band therein, and means for actuating said picker and gripping devices.

26. In a machine for affixing circumferential bands upon cigars or the like, the combination, with means for presenting the band for affixment, and means for affixing said band about the cigar; of a bending device that bends downward a limited portion of the end of the band, previous to its affixment.

27. In a cigar-banding machine, in combination with a supply-holder for bands, and means for affixing a band about a cigar; a band transferring picker that takes bands adhesively from the supply-holder, and a gripping device for temporarily gripping the band against the picker-face, said gripping device being provided with means for bending downward a portion of the band beyond the picker, and means for actuating said picker and gripping device.

28. In a cigar-banding machine, means for supporting a pack of bands, band-affixing devices in alinement therewith, a reciprocating glue-applying picker for transferring bands thereto, an endwise laterally shifting gripping device closable against the face of said picker for retaining the band thereon, and means for shifting said grip-device into and out of alinement with the path of the picker.

29. In a cigar-banding machine, the combination of a work-supporting rotator comprising rollers having their axles supported at one end, said rollers outstanding across the central vertical plane or path of the bands from one direction, and a projectingly supported band-carrying picker-device disposed across the path of the bands and having an outstanding support from the opposite direction, and means for moving said picker-device past said rollers.

30. In a cigar-banding machine, the combination, of a series of rollers disposed for supporting a cigar or the like and winding a band thereon, a pair of said rollers being movable transversely from and toward the others, a movable carrier having the axles of said pair of rollers fixed thereto at one end, the rollers mounted thereon, extending across the central plane or path of the bands, a picker-carrier having an arm outstanding in opposite direction across the central plane, a glue-applying picker mounted on said arm and passable between the rollers, a band-supply holder and glue-delivering roll in coöperating alinement with said picker, and means for moving said picker-carrier and picker to transfer a band from the holder to the winding-on rollers.

31. In a cigar-banding machine, a cigar-holding rotator or matrix including a roller consisting of an exterior cylindrical body of soft or semi-elastic material, a tubular metal lining extending through said body and projecting at either end thereof, and having a gear-pinion and pulley rigidly fixed upon one projecting end of said tube; in combination with a non-rotatable axis spindle upon which said tubular lining is removably supported to revolve, substantially as shown.

32. In a cigar-banding machine, in combination with a band-supply holder, and means for affixing a band about the cigar, a picker-carrier, means for moving said carrier from the holder to the affixing mechanism, a picker mounted on said picker-carrier, a band-gripping device, means for moving said gripping device laterally into and from alinement with the path of the picker, and for engaging and releasing its grip upon the band.

33. In a cigar-banding machine, in combination with a band-supply-holder and band-affixing mechanism; a picker-carrier-slide, a longitudinal guide-way therefor; a vertically moving picker-carrier mounted on the slide, a lifting-bar disposed longitudinal with said guide-way, traversing means connecting the picker-carrier and lifting-bar, means for supporting and elevating the lifting-bar, a picker mounted upon an arm of the picker-carrier for taking labels from the holder, a retractable gripping device coacting with said picker, a grip-actuating lever mounted on the picker-carrier, a controlling rod extending approximately parallel with the direction of the slide movement, and having bosses for moving said lever, means for shifting said rod endwise, and means for actuating the picker-carrier-slide.

34. In a machine of the character described, the combination with the picker-carrier, the picker mounted to have oscillative action upon an arm thereof, and provided with a stop-lug and reacting spring, an endwise shifting grip-bar provided with inclined controlling surfaces, and a gripping-head coacting with the picker-face, a pressure spring for said grip-bar, means for effecting endwise movement of said grip-bar, a controlling rod therefor, and means for operating said rod.

35. In a cigar-banding machine, in combination with means for affixing a band about a cigar; a feed-chute having an entrance mouth and channel adapted for receiving cigars or the like in laterally disposed order, a bottom feed-way, a stationary wall and an adjustable wall for regulating the width of the chute channel, means for singly segregating cigars at said feed-way, and an ejecting means whereby the segregated cigar is transferred from the feed-way to the band-affixing devices.

36. In a cigar-banding machine, the cigar-feed-hopper comprising an inclined table or plate terminating in a downward chute channel for lateral disposal of cigars or the like in parallel order, a separator device near the bottom of the chute for the segregation and delivering of single cigars, and a reciprocating means that pushes said single cigars endwise from the bottom of the chute.

37. In a machine of the character described, the combination with means for affixing a band about a cigar or the like, a feed hopper and chute having a channel adapted for receiving and supporting cigars in laterally disposed order, means for feeding the cigars singly from the chute to the band-affixing means, and a transverse end-partition adjustable within said hopper and chute for gaging the channel thereof to accommodate cigars of different length.

38. In a cigar-banding machine, the combination as described, of the delivering-chute having approximately upright front and rear walls and a cradle or feed-way bottom, the check-device and separator-device, each comprising a movable member supported at the back of the chute, and having a blade portion that swings through an opening therein, the operating shaft, a pair of cams mounted on said shaft, connection-bars pivoted at one end to said movable check and separator members, their other ends respectively engaging with said cams, and springs connected therewith for yieldably advancing said separator and check devices into the channel of the chute, substantially as set forth.

39. In a cigar-banding machine, the combination of a cigar-feeding hopper and chute, comprising an inclined receiving-table and chute channel leading therefrom, terminating in a bottom feed-way, an endwise movable feeder-rod reciprocating through said feed-way, a cigar-engaging check, and a separator-device movable into and from the chute, a cam-shaft, cams thereon and connections therefrom for respectively operating said check and separator, an oscillating lever connected with said feeder-rod, and a cam on said cam-shaft for operating said lever, substantially as set forth.

40. In a cigar-banding machine, in combination with means for gluing and presenting a band, means for supporting and revolving the cigar, comprising rollers for laying the band thereon, a feed-chute having a guide-way, a pusher working through said guide-way, and a tubular funnel in alinement with said guide-way for conducting the cigar from in front of the chute as it passes endwise into the rotator or supporting matrix and means for actuating said pusher.

41. In a machine of the character described, a band-supply-holder that supports the ends of a pack of bands, a glue-applying picker capable of horizontal and vertical movement that upwardly contacts near one end of the pack and adhesively withdraws a band singly therefrom, a gripping device acting against the face of said picker and having a member that bends down the extremity of the band, means for actuating the picker and gripping devices, a band-curling device, means comprising a system of rollers disposed at intervals for embracing the exterior of a cigar or the like, for supporting it and wrapping the band about its circumference, a cigar-feed chute, and means for projecting cigars singly therefrom to said roller system.

42. In a cigar-holding matrix or rotator of a cigar-banding machine, in combination, a projecting supporting-axis, an endwise removable roll consisting of a tubular metallic shell or bushing having at one end a drive-gear fixed thereon, and a non-metallic cylindrical body surrounding and fixed to said shell and presenting a frictional or semi-elastic exterior surface against which the cigar is supported, said tubular roller with its drive-gear having a central bore adapted to be slipped endwise onto and from said projecting supporting axis, and a readily releasable fastener for confining said roller upon its axis.

43. In a banding machine, a band-supply holder comprising independent end-guiding supports for the respective ends of the pack of bands, each of said guiding supports provided with a pair of opposite laterally adjustable side-guides carried thereon, and means for oppositely adjusting the pairs of side guides for greater or less width of band, independently for the respective ends.

44. In a machine of the character described, a band-supply holder with supports for the ends of a pack of cigar bands or the like, a picker that contacts beneath one end of the pack and takes bands by bottom delivery singly therefrom, a retractable grip-device coacting with said picker, a picker-carrier offset from the line of the picker and band-supply-holder, means for actuating the picker-carrier and grip-device, a system of rollers for supporting a cigar or the like, and winding the band about the exterior thereof, and means for inducting the band rear end first into the winding-on system for disengagement from the picker by reverse action.

Witness my hand this 16th day of April, 1908.

FRANK O. WOODLAND.

Witnesses:
CHAS. H. BURLEIGH,
ELLA P. BLENUS.